US010358548B2

(12) United States Patent
Boucard et al.

(10) Patent No.: US 10,358,548 B2
(45) Date of Patent: Jul. 23, 2019

(54) THERMOPLASTIC SILICONE ELASTOMERS

(71) Applicant: Multibase SA, St. Laurent du Pont (FR)

(72) Inventors: Sylvain Boucard, Pont de Beauvoisin (FR); Herve Faucheron, Les Abrets (FR); Guillaume Gourdain, Moirans (FR)

(73) Assignee: MULTIBASE SA, St. Laurent du Pont (FR)

( * ) Notice: Subject to any disclaimer, the term of this patent is extended or adjusted under 35 U.S.C. 154(b) by 0 days.

(21) Appl. No.: 15/528,117

(22) PCT Filed: Nov. 20, 2015

(86) PCT No.: PCT/EP2015/077274
§ 371 (c)(1),
(2) Date: May 19, 2017

(87) PCT Pub. No.: WO2016/079324
PCT Pub. Date: May 26, 2016

(65) Prior Publication Data
US 2017/0313882 A1 Nov. 2, 2017

(30) Foreign Application Priority Data

Feb. 20, 2015 (EP) .................................... 15305260

(51) Int. Cl.
| *C08L 23/14* | (2006.01) |
| *C08L 83/04* | (2006.01) |
| *C08L 23/08* | (2006.01) |
| *C08L 23/16* | (2006.01) |
| *C08L 25/10* | (2006.01) |
| *C08L 51/06* | (2006.01) |
| *C08L 83/00* | (2006.01) |
| *C08G 77/12* | (2006.01) |
| *C08G 77/20* | (2006.01) |
| *C08K 3/26* | (2006.01) |

(52) U.S. Cl.
CPC .......... *C08L 23/14* (2013.01); *C08L 23/0884* (2013.01); *C08L 23/16* (2013.01); *C08L 25/10* (2013.01); *C08L 51/06* (2013.01); *C08L 83/00* (2013.01); *C08L 83/04* (2013.01); *C08G 77/12* (2013.01); *C08G 77/20* (2013.01); *C08K 2003/265* (2013.01); *C08L 2203/20* (2013.01); *C08L 2205/035* (2013.01); *C08L 2207/04* (2013.01)

(58) Field of Classification Search
CPC combination set(s) only.
See application file for complete search history.

(56) References Cited

U.S. PATENT DOCUMENTS

| 4,196,731 A * | 4/1980 | Laurin ................... A61L 29/049 600/435 |
| 4,500,688 A | 2/1985 | Arkles |
| 4,714,739 A | 12/1987 | Arkles |
| 5,844,035 A * | 12/1998 | Ogawa ....................... C08J 5/10 524/494 |
| 5,981,661 A | 11/1999 | Liao et al. |
| 6,013,715 A | 1/2000 | Gornowicz et al. |
| 6,362,288 B1 | 3/2002 | Brewer et al. |
| 6,433,049 B1 | 8/2002 | Romenesko et al. |
| 6,479,580 B1 * | 11/2002 | Chorvath ................. C08L 23/04 524/291 |
| 6,569,958 B1 | 5/2003 | Gross et al. |
| 9,267,026 B2 * | 2/2016 | O'Gara ................... C08L 53/00 |
| 2007/0213431 A1 * | 9/2007 | Adur ..................... C08F 255/00 524/63 |
| 2008/0207832 A1 * | 8/2008 | Worley ................... C08L 53/02 525/89 |

(Continued)

FOREIGN PATENT DOCUMENTS

| JP | S54130656 A | 10/1979 |
| JP | S58189257 A | 11/1983 |

(Continued)

OTHER PUBLICATIONS

PCT/EP2015/077274 International Search Report dated Feb. 1, 2016, 2 pages.
English language abstract and machine translation for JPS54130656 (A) extracted from http://worldwide.espacenet.com database on Apr. 3, 2018, 12 pages.
English language abstract and machine translation for JPS58189257 (A) extracted from http://worldwide.espacenet.com database on Apr. 3, 2018, 11 pages.
English language abstract and machine translation for JPH08291238 (A) extracted from http://worldwide.espacenet.com database on Apr. 3, 2018, 15 pages.

(Continued)

*Primary Examiner* — Marc S Zimmer
(74) *Attorney, Agent, or Firm* — Warner Norcross & Judd LLP

(57) ABSTRACT

Thermoplastic silicone elastomer compositions are disclosed. The thermoplastic elastomer compositions comprise a blend of an organic thermoplastic elastomer and a silicone composition. A process for forming a vulcanized thermoplastic elastomer composition is also disclosed. The thermoplastic elastomer compositions can be used to form functional and/or aesthetic automotive parts such as gear knobs, seat belt connectors, interior mats, airbag protective covers, and over-molded skins for dash boards and armrests; to form appliance parts; to form soft-feel grips for hand held devices; and to form medical devices, sporting goods and general rubber parts. The thermoplastic elastomer compositions provide durable aesthetics, haptic and ergonomic properties along with stability to most commonly used chemicals and high mechanical performance, abrasion and scratch resistance.

19 Claims, No Drawings

(56) References Cited

U.S. PATENT DOCUMENTS

| | | | |
|---|---|---|---|
| 2011/0224019 A1* | 9/2011 | Tutmark | A63B 37/0003 |
| | | | 473/371 |
| 2011/0248424 A1 | 10/2011 | Milesi | |
| 2011/0281984 A1* | 11/2011 | Garois | C08L 23/02 |
| | | | 524/168 |
| 2012/0121876 A1* | 5/2012 | Milesi | C08L 53/025 |
| | | | 428/220 |
| 2014/0057118 A1* | 2/2014 | Honda | C08L 23/10 |
| | | | 428/447 |
| 2015/0276023 A1 | 10/2015 | Rognon et al. | |
| 2017/0369691 A1* | 12/2017 | Wu | C08L 23/14 |

FOREIGN PATENT DOCUMENTS

| | | |
|---|---|---|
| JP | H08291238 A | 11/1996 |
| JP | 10060197 A | 3/1998 |
| JP | 2005507021 A | 3/2005 |
| JP | 2007204644 A | 8/2007 |
| JP | 2011225875 A | 11/2011 |
| JP | 2012526666 A | 11/2012 |
| WO | WO03035759 A1 | 5/2003 |
| WO | WO2014056892 A1 | 4/2014 |

OTHER PUBLICATIONS

English language on abstract and machine translation for JP10-060197 (A) extracted from http://www.j-platpat.inpit.go.jp database on Apr. 3, 2018, 12 pages.

English language abstract and machine translation for JP2007204644 (A) extracted from http://worldwide.espacenet.com database on Apr. 3, 2018, 34 pages.

* cited by examiner

THERMOPLASTIC SILICONE ELASTOMERS

CROSS-REFERENCE TO RELATED APPLICATIONS

This application is the National Stage of International Application No. PCT/EP2015/077274 filed on 20 Nov. 2015, which claims priority to and all advantages of EP Patent Application No. 14306856.7 filed on 21 Nov. 2014 and EP Patent Application No. 15305260.0 filed on 20 Feb. 2015, the contents of which are hereby incorporated by reference.

This invention relates to thermoplastic silicone elastomer compositions comprising a blend of an organic thermoplastic elastomer and a silicone composition, and to a process for forming a vulcanised thermoplastic elastomer composition.

In one aspect the invention relates to the use of such a thermoplastic elastomer composition to form functional and aesthetics automotive parts such as gear knobs, seat belt connector, interior mat, airbag protective cover, overmoulded skin for dash board and armrest; to form appliance parts soft-feel grips for hand held devices; to form medical devices, sporting goods and general rubber parts; requiring durable aesthetics, haptic and ergonomic properties along with stability to most commonly used chemicals and high mechanical performances, abrasion and scratch resistance.

The thermoplastic elastomer composition according to the invention may be used to fabricate parts or components for automotive, appliances, electronics, portable electronic, electrical, communication, and medical applications, where sufficient feel and touch, scratch and mar resistance, chemical resistance and mechanical performances may be desired, simultaneously.

Silanes and siloxanes are compounds containing silicon. A silane is a compound derived from $SiH_4$. A silane often contains at least one Si—C bond. A silane usually contains only one Si atom.

A siloxane is a compound which contains at least one Si—O bond.

A polysiloxane contains several Si—O—Si— bonds forming a polymeric chain, where the repeating unit is —(Si—O)—. An organopolysiloxane is sometimes called a silicone. An organopolysiloxane contains repeating —(Si—O)— units where at least one Si atom bears at least one organic group. "Organic" means containing at least one carbon atom. An organic group is a chemical group comprising at least one carbon atom.

A polysiloxane comprises terminal groups and pendant groups. A terminal group is a chemical group located on a Si atom which is at an end of the polymer chain. A pendant group is a group located on a Si atom which Si atom is not at the end of the polymeric chain.

A polymer is a compound containing repeating units which units typically form at least one polymeric chain. A polymer can be a homopolymer or a copolymer. A homopolymer is a polymer which is formed from only one type of monomer. A copolymer, also referred to as interpolymer, is a polymer formed from at least two monomers of at least two different types. Both terms "interpolymer" and "copolymer" may be used interchangeably. A terpolymer is a polymer formed from three types of monomers. A block copolymer is a copolymer of at least two subunits each composed of one type of monomer, that is, one type of monomer forms a homopolymeric subunit (also called "block"), which is covalently bonded to at least one homopolymeric subunit of the second type of monomers. A polymer is called an organic polymer when the repeating units contain carbon atoms. Some polymers are thermoset: once cooled and hardened, these polymers retain their shapes and cannot return to their original form. Other polymers are thermoplastics: they can soften upon heating and return to their original form.

A cross linking reaction is a reaction where two or more molecules, at least one of them being a polymer, are joined together to harden or cure the polymer. A cross linker is a compound able to produce a crosslinking reaction of a polymer.

A gum is a usually made of a polymer of high molecular weight. A gum takes the form of a fluid having a high viscosity. A gum typically has a viscosity of at least 100 mPa·s at 25° C. A gum can have a viscosity of up to 2 000 000 mPas at 25° C. or even more.

An elastomer, sometimes called a rubber, is a polymer having both viscosity and elasticity. Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. The first type of thermoplastic elastomer is a block copolymer thermoplastic elastomer which contains "hard" polymeric segments which have a melting point or glass transition temperature above ambient temperature as well as "soft" polymeric segments which have a glass transition or melting point considerably below room temperature. In these systems, the hard segments aggregate to form distinct microphases and act as physical crosslinks for the soft phase, thereby imparting a rubbery character at room temperature. At temperatures higher than room temperatures, the hard segments melt or soften and allow the copolymer to flow and to be processed like an ordinary thermoplastic elastomer.

The second type of thermoplastic elastomer is a thermoplastic elastomer referred to as a simple blend (physical blend), which can be obtained by uniformly mixing an elastomeric component with a thermoplastic component. The elastomeric component is a component which has elastomeric properties, such as a hardness below 80 A and high elasticity designated by an elongation at break >100% and elastic recovery (also referred to as high elasticity). When the elastomeric component is also cross-linked during mixing, a thermoplastic elastomer known in the art as a thermoplastic vulcanizate (TPV) results. Since the cross-linked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomeric component and the thermoplastic component are mixed and the elastomeric component is cured with the aid of a crosslinking agent and/or catalyst during the mixing process. A number of such TPVs are known in the art, including some wherein the crosslinked elastomeric component can be a silicone polymer, such as a silicone elastomer, while the thermoplastic component is an organic, non-silicone polymer (i.e. a thermoplastic silicone vulcanizate or TPSiV). The present invention concerns thermoplastic silicone elastomer where the elastomeric component is a silicone elastomer, while the thermoplastic component is an organic, non-silicone polymer.

U.S. Pat. No. 6,013,715 discloses a method for preparing a thermoplastic elastomer, said method comprising (I) first mixing (A) a thermoplastic resin selected from the group consisting of a polyolefin and a poly(butylene terephthalate), (B) a diorganopolysiloxane having a plasticity of at least 30 and having an average of at least 2 alkenyl radicals in its molecule, (C) an organohydrido silicon compound which contains an average of at least 2 silicon-bonded hydrogen groups in its molecule, (D) optionally, a reinforcing filler and (E) a hydrosilation catalyst, components (C) and (E) being present in an amount sufficient to cure said diorganopolysiloxane (B); and (II) dynamically curing said diorganopolysiloxane (B), wherein the amount of said diorganopolysiloxane (B) used is such that at least one property of the thermoplastic elastomer selected from tensile strength or elongation is at least 25% greater than the respective property for a corresponding blend wherein said diorganopolysiloxane is not cured and said thermoplastic elastomer has an elongation of at least 25%.

U.S. Pat. No. 6,433,049 discloses a method of making a thermoplastic silicone vulcanizate comprising (I) mixing (A) 100 parts by weight of a thermoplastic polyolefin resin, (B) 5 to 350 parts by weight polyorganosiloxane having an average of at least 2 alkenyl radicals per molecule, and having a Williams plasticity of at least 30, (C) an organohydrido silicon compound which contains an average of at least 2 silicon-bonded hydrogen groups per molecule, (D) a hydrosilation catalyst, (E) optionally, a reinforcing filler, and (F) 10 to 170 parts by weight of calcium silicate, and (II) dynamically curing said polyorganosiloxane (B) using component (C) and component (D).

U.S. Pat. No. 6,362,288 discloses a method for preparing a thermoplastic elastomer, said method comprising: (I) mixing (A) a rheologically stable polyamide resin having a melting point or glass transition temperature of 25° C. to 275° C., (B) a silicone base comprising (B') 100 parts by weight of a diorganopolysiloxane gum having a plasticity of at least 30 and having an average of at least 2 alkenyl groups in its molecule and (B") 5 to 200 parts by weight of a reinforcing filler, the weight ratio of said silicone base to said polyamide resin being greater than 35:65 to 85:15, (C) for each 100 parts by weight of said polyamide resin, a compatibilizer selected from (i) from 0.1 to 5 parts by weight of a coupling agent having a molecular weight of less than 800 which contains at least two groups independently selected from ethylenically unsaturated group, epoxy, anhydride, silanol, carboxyl, hydroxyl, alkoxy, having 1 to 20 carbon atoms or oxazoline in its molecule, (ii) from 0.1 to 10 parts by weight of a functional diorganopolysiloxane having at least one group selected from epoxy, anhydride, silanol, carboxyl, amine, alkoxy having 1 to 20 carbon atoms or oxazoline in its molecule, or (iii) from 0.1 to 10 parts by weight of a copolymer comprising at least one diorganopolysiloxane block and at least one block selected from polyamide, polyether, polyurethane, polyurea, polycarbonate or polyacrylate, (D) an organohydrido silicon compound which contains an average of at least 2 silicon-bonded hydrogen groups in its molecule and (E) a hydrosilation catalyst, components (D) and (E) being present in an amount sufficient to cure said diorganopolysiloxane (B'); and (II) dynamically curing said diorganopolysiloxane (B').

WO03/035759 discloses a method for preparing a thermoplastic elastomer, said method comprising: (I) mixing (A) a rheologically stable polyamide resin having a melting point or glass transition temperature of 25° C. to 275° C., (B) a silicone base comprising (B') 100 parts by weight of a diorganopolysiloxane gum having a plasticity of at least 30 and having an average of at least 2 alkenyl groups in its molecule and optionally, (B") 5 to 200 parts by weight of a reinforcing filler, the weight ratio of said silicone base to said polyamide resin is from 35:65 to 85:15, (C) a compatibilizer selected from glycidyl ester polymers or organofunctional grafted polyolefins, (D) an organohydrido silicon compound which contains an average of at least 2 silicon-bonded hydrogen groups in its molecule and (E) a hydrosilylation catalyst, components (D) and (E) being present in an amount sufficient to cure said diorganopolysiloxane (B'); and (II) dynamically vulcanizing said diorganopolysiloxane (B').

A need still exists to provide for thermoplastic silicone elastomers with sufficient feel and touch, scratch and mar resistance, chemical resistance and mechanical performances; such performances optionally performed simultaneously.

We have found according to the invention that the present thermoplastic compositions may provide sufficient feel and touch, comfortable grip, scratch and mar resistance, chemical resistance and mechanical performances, when used in fabrication of parts or components for automotive, appliances, electronics, portable electronic, electrical, communication, and medical applications; and when used in overmoulding applications, such as on polyolefinic substrates composing parts or components for automotive and other applications.

A thermoplastic elastomer composition comprising a blend of
(A) a thermoplastic organic polymer comprising
   (A1) a block copolymer elastomer, and
   (A2) a polyolefin elastomer, and
(B) a silicone base comprising
   (B1) a diorganopolysiloxane gum having an average of at least 2 alkenyl groups per molecule and
   (B2) optionally, from 1 to 50% by weight based on the diorganopolysiloxane gum (B1) of a reinforcing filler, and
(C) an organohydrido silicone compound which contains an average of at least 2 silicon-bonded hydrogen groups per molecule
(D) a catalyst
(E) a coupling agent
is provided herein, together with uses of said thermoplastic elastomer composition into the manufacture of wearable items and parts or components for automotive, appliances, electronics, portable electronic, electrical, communication, and medical applications made therefrom. Also provided is a process to prepare the thermoplastic elastomer composition.

The thermoplastic organic polymer (A) typically has a hardness below 45 Shore D. The thermoplastic organic polymer (A) optionally has a hardness below 85 shore A. Hardness is measured at 23° C. according to ISO 868. Hardness may be defined as a material's resistance to permanent indentation. The shore A scale is typically used for softer plastics, while the shore D scale is typically used for harder plastics.

The thermoplastic organic polymer (A) comprises at least one block copolymer elastomer (A1) and at least one polyolef in elastomer (A2).

The (A1) block copolymer elastomer may be chosen from block copolymers having two or more hard blocks of aromatic vinyl units and one or more unsaturated, partially saturated, or fully saturated aliphatic soft blocks.

For the avoidance of doubt hard blocks are so named because they have a glass transition point (Tg) at a significantly higher temperature than the soft blocks. Typically the hard blocks will have a Tg of >50° C. and alternatively >80° C. and the soft blocks will have a Tg<50° C. typically between −10 and 25° C.

The (A1) block copolymer elastomer may be a thermoplastic elastomer consisting of at least a triblock copolymer of styrene and a specific diene, where two end-blocks are polystyrene and the internal block(s) is/are polydiene or hydrogenated polydiene.

Examples of (A1) block copolymer elastomers include styrene isoprene copolymer, styrene butylene copolymer, styrene ethylene propylene terpolymer, styrene butylene ethylene terpolymer, and mixtures thereof.

Other examples of block copolymer elastomers include acrylic styrene copolymer, that is a copolymer of styrene with at least one acrylic monomer such as an acrylate or methacrylate ester or acrylonitrile. The acrylic styrene copolymer can for example be an acrylonitrile-butyl acrylate-methyl methacrylate-styrene copolymer.

The (A1) block copolymer elastomer may be modified with a hydrocarbon resin miscible with the soft blocks. For instance, component (A1) can be formulated with aromatic or aliphatic hydrocarbons resins as C9, C9 hydrogenated, C9 partially hydrogenated, C5, C5/C9 copolymers, terpenes, stabilized rosin ester, dicyclopentadiene (OCPO) hydrogenated to adjust its primary peak of Tg(delta) toward the most suitable value and location in temperature for the application. Other ingredients may be used in conjunction with the (A1) block copolymer elastomer, such as plasticizers (paraffinic or naphtenic organic oils), mineral fillers and else.

The polyolefin elastomer may be selected from homopolymers of olefins as well as interpolymers of one or more olefins with each other and/or up to 40 mole percent of one or more monomers which are copolymerizable with the olefins. Examples of suitable polyolefins include homopolymers of ethylene, propylene, butene-1, isobutylene, hexene, 1,4methylpentene-1, pentene-1, octene-1, nonene-1 and decene-1, inter alia. These polyolefins can be prepared using peroxide, Ziegler-Natta or metallocene catalysts, as well known in the art. Interpolymers of two or more of the above mentioned olefins may also be employed as component (A2) and they may also be copolymerized with, e.g., vinyl or diene compounds or other such compounds which can be copolymerized with the olefins.

Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

The polyolefin may also be a blend of two or more of the above mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Examples of polyolefins include polyethylene (PE) polymers such as low pressure, substantially linear, ethylene homopolymers and interpolymers of ethylene with alpha-olefins having 3 to 10 carbon atoms, such interpolymers being known as linear low density polyethylene (LLDPE) in the art. These systems typically have a density of from 0.85 to 0.97 g/cc, alternatively of from 0.875 to 0.930 g/cc, and weight average molecular weight ranging of from 60,000 to 1,000,000.

Further examples of polyolefins include polypropylene (PP) polymers, including atactic, syndiotactic or isotactic PP. These are typically homopolymers of propylene or interpolymers of propylene with minor proportions of ethylene. Such PP systems can have the ethylene polymerized randomly with propylene units or a number of ethylene units may be linked to form a block copolymer.

The thermoplastic organic polymer (A) comprises (A1) a block copolymer elastomer, and (A2) a polyolefin elastomer, at a ratio A1/A2 of 10:90 to 90:10, alternatively of 70:30 to 30:70, alternatively of 50:50 to 50:50.

The diorganopolysiloxane gum having an average of at least 2 alkenyl groups per molecule (B1) may have a predominantly linear molecular structure. The diorganopolysiloxane gum (B1) usually has a viscosity of at least 100 mPa·s at 25° C., for example at least 300 mPa·s, and may have a viscosity of up to 90000 mPa·s, for example up to 70000 mPa·s.

The alkenyl groups of the diorganopolysiloxane gum (B1) can be exemplified by vinyl, hexenyl, allyl, butenyl, pentenyl, and heptenyl groups. Silicon-bonded organic groups in organopolysiloxane (A) other than alkenyl groups may be exemplified by methyl, ethyl, propyl, butyl, pentyl, hexyl, or similar alkyl groups; or phenyl, tolyl, xylyl, or similar aryl groups.

The organopolysiloxane gum (B1) can for example comprise an α,ω-vinyldimethylsiloxy polydimethylsiloxane, an α,ω-vinyldimethylsiloxy copolymer of methylvinylsiloxane and dimethylsiloxane units, and/or an α,ω-trimethylsiloxy copolymer of methylvinylsiloxane and dimethylsiloxane units. The organopolysiloxane gum (B1) can, if desired, be modified with a small amount of an unreactive silicone such as a trimethylsilyl-terminated polydimethylsiloxane.

The reinforcing filler (B2) can for example be silica. The silica can for example be fumed (pyrogenic) silica, such as that sold by Cabot under the trade mark Cab-O-Sil MS-75D, or can be precipitated silica. The particle size of the silica is for example in the range 0.5 μm to 20 μm, alternatively 1 μm to 10 μm. The silica can be treated silica produced for example by treating silica with a silane or with a polysiloxane. The silane or polysiloxane used to treat the silica usually contains hydrophilic groups which bond to the silica surface and aliphatically unsaturated hydrocarbon or hydrocarbonoxy groups and/or Si-bonded hydrogen atoms.

The silica can for example be treated with an alkoxysilane, for example a silane comprising at least one Si-bonded alkoxy group and at least one Si-bonded alkenyl group or at least one Si-bonded hydrogen atom. The alkoxysilane can be a monoalkoxysilane, a dialkoxysilane or a trialkoxysilane containing at least one aliphatically unsaturated hydrocarbon group such as a vinylalkoxysilane, for example vinyltrimethoxysilane, vinyltriethoxysilane or vinylmethyldimethoxysilane. The Si-bonded alkoxy groups are readily hydrolysable to silanol groups which bond to the silica surface.

The silica can alternatively be treated with a polysiloxane, for example an oligomeric organopolysiloxane, containing Si-bonded alkenyl groups and silanol end groups. The silica can for example be treated with 2% to 60% by weight based on the silica of an alkoxysilane containing alkenyl groups or an oligomeric organopolysiloxane containing alkenyl groups.

When present in the silicone base (B), the (B2) reinforcing filler is used at an amount of from 1 to 50% wt, based on the weight of the (B1) diorganopolysiloxane gum having an average of at least 2 alkenyl groups in its molecule.

The organohydrido silicone compound (C) which contains an average of at least 2 silicon-bonded hydrogen groups per molecule can for example be a low molecular weight organosilicon resin or a short or long chain organosiloxane polymer, which may be linear or cyclic. The organohydrido silicone compound (C) typically has at least 3 silicon-bonded hydrogens per molecule which are capable of reacting with the alkenyl or other aliphatically unsaturated groups of the polyorganosiloxane gum (B1). The organohydrido silicone compound (C) may for example have the general formula

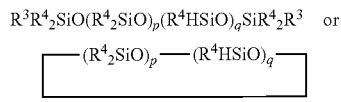

wherein $R^4$ denotes an alkyl or aryl group having up to 10 carbon atoms, and $R^3$ denotes a group $R^4$ or a hydrogen atom, p has a value of from 0 to 20, and g has a value of from 1 to 70, and there are at least 2 or 3 silicon-bonded hydrogen atoms present per molecule. $R^4$ can for example be a lower alkyl group having 1 to 3 carbon atoms, such as a methyl group. The organohydrido silicone compound (C) can for example have a viscosity of from 1 to 150 mPa·s at 25° C., alternatively 2 to 100 mPa·s, alternatively 5 to 60 mPa·s at 25° C. The average degree of polymerisation of the organohydrido silicone compound (C) can for example be in the range 30 to 400 siloxane units per molecule. Examples of suitable organohydrido silicone compounds (C) include trimethylsiloxane end-blocked polymethylhydrosiloxanes, dimethylhydrosiloxane end-blocked methylhydro siloxane, dimethylsiloxane methylhydrosiloxane copolymers and tetramethylcyclotetrasiloxane. The organohydrido silicone compound (C) may comprise a mixture of more than one of these materials.

The molar ratio of Si—H groups in the organohydrido silicone compound (C) to aliphatically unsaturated groups in the organopolysiloxane gum (B1) is typically at least 1:1 and can be up to 8:1 or 10:1. For example the molar ratio of Si—H groups to aliphatically unsaturated groups is in the range from 1.5:1 to 5:1.

Catalyst (D) is typically a hydrosilylation catalyst. The catalyst (D) is typically a platinum group metal (Group VIII of the Periodic Table) or a compound thereof. Platinum and/or platinum compounds may be used, for example finely powdered platinum; a chloroplatinic acid or an alcohol solution of a chloroplatinic acid; an olefin complex of a chloroplatinic acid; a complex of a chloroplatinic acid and an alkenylsiloxane; a platinum-diketone complex; metallic platinum on silica, alumina, carbon or a similar carrier; or a thermoplastic resin powder that contains a platinum compound. Catalysts based on other platinum group metals can be exemplified by rhodium, ruthenium, iridium, or palladium compounds. For example, these catalysts can be represented by the following formulas: $RhCl(PPh_3)_3$, $RhCl(CO)(PPh_3)_2$, $Ru_3(CO)_{12}$, $IrCl(CO)(PPh_3)_2$, and $Pd(PPh_3)_4$ (where Ph stands for a phenyl group).

The catalyst (D) is typically used in an amount of 0.5 to 100 parts by weight platinum group metal based on the polyorganosiloxane (B1), alternatively 1 to 50 parts per million. The hydrosilylation catalyst (D) catalyses the reaction of the alkenyl groups of organopolysiloxane gum (B1) with the Si—H groups of organopolysiloxane (C).

The coupling agent (E) is a compound able to bring chemical or physical compatibility between the thermoplastic organic polymer and the crosslinked silicone elastomeric component produced by the reaction of the silicone base (B) with the organohydrido silicone compound (C) in the presence of the catalyst (D).

Typically the coupling agent (E) is selected from glycidyl ester functional polymers, organofunctional grafted polyolefins, polymer compositions comprising a thermoplastic polymer selected from a polyacetal and a polyolefin, and a branched block copolymer of a polysiloxane and an olefin polymer, or mixtures thereof.

A glycidyl ester functional polymer is defined as a polymer comprising repeating units derived from one or more glycidyl ester monomers. The glycidyl ester functional polymer can be a homopolymer, copolymer, or terpolymer. A glycidyl ester monomer means a glycidyl ester of an ethylenically unsaturated carboxylic acid such as, e.g., acrylic acid, methacrylic acid, itaconic acid, and includes, e.g., glycidyl acrylate, glycidyl methacrylate, glycidyl itaconate.

Examples of glycidyl ester functional polymers include glycidyl esters described in U.S. Pat. No. 5,981,661 as glycidyl ester impact modifiers. Typically, the glycidyl ester functional polymer comprises first repeating units derived from one or more glycidyl ester monomers and second repeating units derived from one or more alpha-olefin monomers, e.g., ethylene, propylene, 1-butene, 1-pentene. The glycidyl ester monomer may be glycidyl acrylate or glycidyl methacrylate.

Suitable glycidyl ester polymers may, optionally, contain up to 50 wt %, alternatively up to 20%, alternatively up to 10%, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and (C1-C20) alkyl (meth)acrylates such as, e.g., butyl acrylate, methyl methacrylate, cyclohexyl methacrylate. As used herein, the term "(C1-C20) alkyl" means a straight or branched alkyl group having of from 1 to 20 carbon atoms per group, such as e.g., methyl, ethyl, decyl, eicosyl, cyclohexyl and the term "(meth)acrylate" refers collectively to acrylate compounds and methacrylate compounds.

Suitable glycidyl ester copolymers can be made by, e.g., conventional free radical initiated copolymerization.

The glycidyl ester polymers useful as compatibilizers in the present invention are selected from olefin-glycidyl (meth)acrylate polymers, olefin-vinyl acetate-glycidyl (meth)acrylate polymers and olefin-glycidyl (meth)acrylate-alkyl (meth)acrylate polymers, and from random ethylene/acrylic ester/glycidyl methacrylates copolymers or terpolymers, such as the LOTADER® GMA products marketed by Elf Atochem (Elf Atochem, North America, Inc., Philadelphia, Pa.) as LOTADER® AX 8900 Resin, LOTADER® AX 8930, and LOTADER® AX 8840, and mixtures thereof.

The coupling agent (E) may also be selected from an organofunctional grafted polyolefin. An "organofunctional grafted polyolefin" is here defined as a homopolymer, copolymer or terpolymer of an olefin with an organofunctional grafting monomer.

Representative examples of suitable olefins include: ethylene, propylene, butylene, and the like; mixtures of olefins, for example ethylene, propylene and dienes, i.e. so called EPDM. The olefin can also be selected from C5-C20 hydrocarbon alpha-olefins, vinyl acetate, alkyl acrylate or alkyl methacrylates, where the alkyl groups can be methyl, ethyl, propyl, butyl, and the like. Suitable examples of the hydrocarbon alpha-olefins include: 1-hexene, 1-octene, and 1-decene. Examples of the alkyl groups of the alkyl acrylates include methyl, ethyl, propyl and butyl.

The organofunctional grafting monomer can be selected from ethylenically unsaturated hydrocarbons containing the following organofunctional groups: carboxylic acids, carboxylic acid salts, amides, imides, esters, anhydrides, epoxy, alkoxy, and oxazoline. The oxazoline group has the structure wherein the ring may contain one or more substituents selected from hydrocarbon groups having 1 to 4 carbon atoms.

Examples of ethylenically unsaturated hydrocarbons containing carboxylic acids and anhydrides, are acrylic acid, methacrylic acid, maleic acid, fumaric acid, itaconic acid, crotonic acid, itaconic anhydride, maleic anhydride, and substituted maleic anhydride, e.g. dimethyl maleic anhydride or citraconic anhydride, nadic anhydride, nadic methyl anhydride, and tetrahydrophthalic anhydride. Examples of the derivatives of the unsaturated acids are salts, amides, imides and esters e.g. mono- and disodium maleate, acrylamide, maleimide, glycidyl methacrylate and dimethyl fumarate. Examples of epoxy functional monomers include allyl glycidyl ether, 1,2-epoxy-7-octene; 1,2-epoxy-9-decene; 1,2-epoxy-5-hexene. An example of an oxazoline functional monomer is vinyloxazoline. The grafting monomer for use in the coupling agent (E) may be selected from maleic anhydride and maleic anhydride derivatives.

The coupling agent (E) may be selected from poly(ethylene-co-vinyl acetate)-graft-maleic anhydride, polypropylene-graft-maleic anhydride, polyethylene-polypropylene-grafted-maleic anhydride, maleic anhydride grafted EPDM rubber, maleic anhydride grafted SEBS (styrene-ethylene/butene-styrene triblock copolymer).

Alternatively, the coupling agent (E) as an organofunctional grafted polyolefin may be maleic anhydride grafted EPDM, for example commercially available as Royaltuf® 485-B (Uniroyal Chemical Company, Inc., Middlebury), or maleic anhydride grafted polypropylene, available commercially as Polybond® (Uniroyal Chemical Company, Inc., Middlebury).

The coupling agent (E) may also be selected from polymer compositions comprising a thermoplastic polymer selected from a polyacetal and a polyolefin, and a branched block copolymer of a polysiloxane and an olefin polymer.

The polyacetal in the polymer compositions comprising a thermoplastic polymer selected from a polyacetal and a polyolefin, and a branched block copolymer of a polysiloxane and an olefin polymer may be described as thermoplastic polymers obtained from the polymerization of formaldehyde or cyclic oligomers of formaldehyde, including polyoxymethylene and copolymers comprising mainly oxymethylene units.

The polyolefin in the polymer compositions comprising a thermoplastic polymer selected from a polyacetal and a polyolefin, and a branched block copolymer of a polysiloxane and an olefin polymer may be a homopolymer such as polyethylene, polypropylene or polystyrene, or can be a copolymer such as a copolymer of an olefin with an ethylenically unsaturated ester, for example a copolymer of ethylene with an acrylate or methacrylate ester or an ethylene vinyl acetate copolymer.

The branched block copolymer of a polysiloxane and an olefin polymer in the polymer compositions comprising a thermoplastic polymer selected from a polyacetal and a polyolefin, and a branched block copolymer of a polysiloxane and an olefin polymer may be described as the reaction product of a polysiloxane containing ethylenically unsaturated groups with an olefin polymer, and is typically free of any siloxane homopolymer.

The ethylenically unsaturated groups in said polysiloxane containing ethylenically unsaturated groups may be selected from vinyl, allyl, styryl, acrylic and methacrylic groups, or any other group containing a double bond or triple bond capable of reacting radically with a polyolefin chain. The ethylenically unsaturated groups may be present in end-capping groups on terminal silicon atoms of the polysiloxane, and/or may be present in diorganosiloxane groups forming part of the polysiloxane chain.

The polysiloxane in said polysiloxane containing ethylenically unsaturated groups may contain on average more than 2 ethylenically unsaturated groups per molecule, in pendant and/or terminal positions.

The polymer compositions comprising a thermoplastic polymer selected from a polyacetal and a polyolefin, and further comprising a branched block copolymer of a polysiloxane and an olefin polymer include those described in GB application No. 1405722.8 filed on 31 Mar. 2014.

The amounts of coupling agent (E) may range of from 0.01 to 25 weight percent of the thermoplastic elastomer composition, alternatively of from 0.1 to 20% wt, alternatively of from 1 to 15% wt, and alternatively of from 2 to 8% wt of the thermoplastic elastomer composition.

The weight ratio of the (A):(B) components in the thermoplastic elastomer composition is always a respective amount of (A) and (B) with a total amount of (A)+(B) of 100.

The weight ratio of (A) the organic polymer, comprising (A1), (A2)+(E) the coupling agent to (B) the silicone base+(C) the organohydrido silicone+(D) the catalyst, is generally in the range of from 50:50 to 85:15. Within this range, the level of silica in the silicone base (B), the weight ratio of the thermoplastic organic polymer (A) to the silicone base (B) and the cross-linking density of the silicone can be varied to give the desired balance of soft touch feel, mechanical performance, moisture resistance, chemical resistance against cosmetics and scratch resistance. The cross-linking density of the silicone can be varied by varying the diorganopolysiloxane gum (B1) used, in particular with respect to the siloxane chain length between alkenyl groups. A long chain diorganopolysiloxane gum (B1) having only two terminal alkenyl groups will form a softer thermoplastic elastomer; a diorganopolysiloxane gum (B1) having more alkenyl groups or a shorter chain length will form a harder thermoplastic elastomer.

Other additional components may be present in the thermoplastic elastomer compositions of the invention to obtain a desired processing or performance property for the thermoplastic elastomer. Such additional components may for example include softening mineral oils, plasticisers, other mineral fillers, pigments, dyes, viscosity modifiers, stabilisers, lubricants and/or flexibilizers.

Mineral oils are generally petroleum distillates in the $C_{15}$ to $C_{40}$ range, for example white oil, liquid paraffin or a naphthenic oil. If used, the mineral oil can for example be premixed with the thermoplastic organic polymer (A). The mineral oil can for example be present at 0.5 to 20% by weight of the thermoplastic elastomer composition. The present thermoplastic elastomer composition may be free of mineral oil.

In combination with or alternatively to mineral oils, triaryl phosphate isopropylated, resorcinal bis-(diphenyl phosphate) or phosphate ester sold by Great Lakes Chemical corporation under the trade mark Reofos® RDP may be used in a range of from 0.5 up to 15% weight of the thermoplastic elastomer composition, for their dual functionality as plasticizing agent and flame retardant in polyurethane.

Plasticizers can be present in combination with or alternatively to mineral oils. Examples of suitable plasticisers include phosphate ester plasticisers such as triaryl phosphate isopropylated, resorcinal bis-(diphenyl phosphate) or phosphate ester sold by Great Lakes Chemical Corporation under the trade mark Reofos® RDP. Such plasticizers can for example be used in a range from 0.5 up to 15%. Phosphate esters have dual functionality as plasticizing agent and flame retardant.

Examples of other mineral fillers include talc or calcium carbonate. Fillers may be treated to make their surface hydrophobic. Fillers may be premixed either with the thermoplastic organic polymer (A) or the silicone base (B). Examples of pigments include carbon black and titanium dioxide. Pigments can for example be premixed with the thermoplastic organic polymer (A).

A stabiliser can for example be an antioxidant, for example a hindered phenol antioxidant such as tetrakis (methylene(3,5-di-tert-butyl-4-hydroxy-hydrocinnamate) methane sold by BASF under the trade mark 'Irganox 1010'. Such an antioxidant can for example be used at 0.05 to 0.5% by weight of the thermoplastic elastomer composition.

A lubricant can for example be a surface lubricating additive to improve the processability of the thermoplastic elastomer in moulding operations. An example of a surface lubricating additive is Ethylbutylstearamide sold by CRODA under the trade mark 'Crodamide-EBS'. A lubricant can for example be used at 0.1 to 2% by weight of the thermoplastic elastomer composition.

The invention provides a process for forming a vulcanised thermoplastic elastomer comprising contacting (A) a thermoplastic organic polymer comprising (A1) a block copolymer elastomer, and (A2) a polyolefin elastomer, (B) a silicone base comprising (B1) a diorganopolysiloxane gum having an average of at least 2 alkenyl groups per molecule and optionally, (B2) from 1 to 50% by weight based on the diorganopolysiloxane gum (B1) of a reinforcing filler, (C) an organohydrido silicone compound which contains an average of at least 2 silicon-bonded hydrogen groups per molecule, (D) a hydrosilylation catalyst, (E) a coupling agent, the weight ratio of the thermoplastic organic polymer (A)+ (E) to the total weight of the silicone base (B) and the organohydrido silicone compound (C) and hydrosilylation catalyst (D) is in the range 50:50 to 85:15.

The thermoplastic elastomer is produced by contacting the thermoplastic organic polymer (A) comprising a block copolymer elastomer (A1), and a polyolefin elastomer(A2), with (B) a silicone base comprising (B1) the diorganopolysiloxane gum having an average of at least 2 alkenyl groups per molecule and (B2) the reinforcing filler, (C) the organohydrido silicone compound containing an average of at least 2 silicon-bonded hydrogen groups per molecule and (D) the hydrosilylation catalyst. The thermoplastic organic polymer (A), the silicone base (B), the organohydrido silicone compound (C) and the hydrosilylation catalyst (D) are generally contacted at elevated temperature, for example a temperature in the range 100° C. to 250° C. A temperature in the range 160° C. to 240° C., alternatively 180° C. to 220° C., can conveniently be used. Reaction of the alkenyl groups of organopolysiloxane gum (B1) with the Si—H groups of organopolysiloxane (C) proceeds simultaneously with mixing of the silicone components (B) and (C) with the thermoplastic organic polymer (A), producing a vulcanised thermoplastic elastomer composition.

The thermoplastic organic polymer (comprising A1 and A2), the silicone base (B), the organohydrido silicone compound (C), the hydrosilylation catalyst (D) and the coupling agent (E) are mixed in any device capable of dispersing the silicone components uniformly in the thermoplastic organic polymer. The thermoplastic organic polymer (comprising A1 and A2), the silicone base (B), the organohydrido silicone compound (C) the hydrosilylation catalyst (D) and the coupling agent (E) can for example be blended in an extruder. The extruder can be a uniaxial extruder, a biaxial extruder, or a multiaxial extruder. A twin screw extruder, particularly one having a length/diameter (L/D) ratio over 40, is generally suitable. The screw speed can for example be 150 to 300 rpm. The residence time of the thermoplastic organic polymer (A) and silicone base (B) in an extruder can for example be 30 to 240 seconds.

The silicone base (B) can be prepared by premixing the diorganopolysiloxane gum (B1) and the reinforcing filler (B2) before feeding the silicone base (B) to the extruder or other mixing device, or the diorganopolysiloxane gum (B1) and the reinforcing filler (B2) can be fed separately to the mixing device. The silicone base (B) can be mixed with the thermoplastic organic polymer (A1, A2) and the coupling agent (E) in the initial processing section of the extruder. The thermoplastic organic polymer (A) and the coupling agent (E) can for example be introduced into the main feed of a co-rotative twin screw extruder operating at a temperature high enough to melt the thermoplastic organic polymer. The silicone base (B) can be added into the already melted olefin polymer phase using for example a gear pump. To maintain the quality of working surroundings and avoid side reactions, inert gas flushing or deaeration using a single stage venting or multi-stage venting can be used.

The organohydrido silicone compound (C) and the hydrosilylation catalyst (D) can be added in subsequent sections of the extruder. Dynamical cure or vulcanizing of diorganopolysilxane is conducted during the mixing stage, typically within the extruder, when both the organohydrido silicone compound (C) and the hydrosilylation catalyst (D) have been added to the composition. The order of addition of the organohydrido silicone compound (C) and the hydrosilylation catalyst (D) is not critical. However whichever of these components is added first should be well dispersed in thermoplastic organic polymer before the other component is added to initiate dynamic vulcanization. For example the organohydrido silicone compound (C) can be added to the composition after the thermoplastic organic polymer (A) and the silicone base (B) and coupling agent (E) have been mixed, and the hydrosilylation catalyst (D) can be added subsequently to initiate dynamic vulcanization while continuing mixing. The organohydrido silicone compound (C) could alternatively be added to the composition with the silicone base (B). In a further alternative, the hydrosilylation catalyst (D) can be added to the composition after the thermoplastic organic polymer (A) and the silicone base (B)

and the coupling agent (E) have been mixed, and the organohydrido silicone compound (C) can be added subsequently to initiate dynamic vulcanization while continuing mixing. Alternatively, the organohydrido silicone compound (C) or the hydrosilylation catalyst (D) can be pre-mixed in the silicone base then remaining reactive component can be added in the subsequent section of the extruder.

Alternative plastic mixing equipment can be used, for example a batch internal mixer such as a Z-blades mixer or a Banbury mixer. The components can be mixed in the order described above, allowing sufficient mixing time for the silicone base (B) and organohydrido silicone compound (C) to be well dispersed in thermoplastic organic polymer before the hydrosilylation catalyst (D) is added to initiate dynamic vulcanization.

The thermoplastic elastomer compositions of this invention can be shaped by any of the processes typically used for thermoplastic materials, for example compression moulding, injection moulding, extrusion and 3D printing. In one embodiment, the thermoplastic elastomer can be bonded, moulded, over-moulded or co-extruded to substrates, such as other thermoplastics, glass or metal without compromising the above attributes. Subsequent process such as thermoforming, sheet compression moulding, sheet insert overmoulding may also be considered.

The thermoplastic elastomer compositions of this invention are suitable for use wherever a soft feel or touch and chemical resistance and scratch resistance are desired simultaneously, that is, combining high mechanical performance, scratch resistance and improved durability with a desirable soft touch. The thermoplastic elastomers can for example be used for fabricating parts or components for electronics, portable electronic, electrical, communication, appliances and medical applications and in overmoulding applications, such as on polyolefinic substrates composing parts or components for automotive and other applications.

Polyamide or polyurethane based thermoplastic compositions are generally not suitable for overmoulding on polyolefinic substrates, because of limited adhesion to such polyolefinic substrates. Typically the thermoplastic elastomer composition of this invention is free of polyamide. Typically the thermoplastic elastomer composition of this invention is free of polyurethane.

The thermoplastic elastomer compositions of this invention is adapted to automotive application such as airbag cover skin, steering wheel skin, gear knobs, grip handle, arm rest, interior skin, car mats (such as cup holder, bin, glove box mat), small knobs, switches, and large automotive parts such as glove box panel, dashboard, door panel, etc (large meaning of surface greater than 20 cm$^2$). Due to its intrinsic elastomeric properties, it can also be used for weather insulation, such as mirror seal, interior and exterior seal.

The thermoplastic elastomer compositions of this invention may be used to produce ducts and cable insulation, electronics and appliances components such as belts, bracelets, soft temple tips, protective covers and wearable electronics; large electronic parts and accessories, hoses, boots, bellows, gaskets, soft-feel covers, keyboards' palm rest, parts and protective covers of laptops and tablet computing devices, protective covers; liquid line component and air ducts; architectural seals; bottle closures; furniture components; packaging components such as seals, bottles, cans, cups; resistant and soft-feel grips for hand held devices; medical and hygiene devices; cookware parts and accessories; sporting and leisure goods such as rackets, bike parts; footwear soles, toys, and general rubber parts.

The thermoplastic elastomer compositions of this invention can have a desirable soft touch feel to skin and/or comfortable grip, and/or high mechanical performance, and/or good scratch resistance and/or chemical resistance (stability to most commonly used chemicals). These attributes of soft touch feel to skin, good scratch resistance and chemical resistance and high mechanical performance can be retained when the thermoplastic elastomer is used in conditions such as prolonged contact with human skin. The silicone, being a breathable material, allows the thermoplastic elastomer to be permeable to gas and water vapor but is hydrophobic enough to limit water condensing inside the composition. As the silicone phase is cross-linked (vulcanised) during the mixing phase and is uniformly micro dispersed into the organic matrix, the thermoplastic elastomer composition has substantial chemical resistance and reduced water pick-up, thus protecting the organic matrix against potential hydrolysis and has high mechanical performance, scratch resistance, mechanical abrasion resistance and resistance to wear resulting in an overall improved durability.

The thermoplastic elastomer compositions of this invention have particular advantage when used to form wearable items such as watch bracelets, GPS bracelets, temple tips and nose pads for sun and reading glasses. Such wearable items retain their attributes over prolonged contact with human skin and various cosmetic chemicals on the skin such as fragrances, moisturizers and creams, and skin exudates such as sweat. For example, one will need to tie a thermoplastic elastomer bracelet close enough to the arm that the bracelet cannot move up and down following the user's arm movement, thus any cosmetics or sweats will come into contact with the plastic. In many of these applications, for example for ear buds and soft temple tips for sunglasses, the thermoplastic elastomer is overmoulded onto a hard substrate to provide a soft touch surface with excellent grip. Bracelets such as watch bracelets are usually not overmoulded; in this application the thermoplastic elastomer has to be soft enough to still provide excellent soft touch yet be hard enough to withstand contact with harder objects that can be nearby; for example one might wear the thermoplastic bracelet alongside a metallic bracelet on same arm.

The thermoplastic elastomer composition of this invention can thus have: a desirable soft touch feel to skin, good scratch resistance, and chemical resistance (stability to most commonly used chemicals). These attributes are retained when the thermoplastic elastomer is extruded, co-extruded, extruded-laminate, calendaring, extruded-calendaring or laminate to form a thermoplastic film, thermoplastic sheet and synthetic leather, with grain or none grain surfaces. The thermoplastic elastomer composition of this invention can be applied on textile creating a laminate forming a synthetic leather product. Co-extrusion or post processing with a compatible material, thermoplastic, synthetic woven or non woven textile can be achieved to form a complex laminate. Co-extrusion or post processing with a non compatible material thermoplastic, synthetic or natural woven or non woven textile, to form a complex laminate can be achieved using adequate primer or interfacial material.

Examples of applications are:
synthetic leather for automotive application uses such as seat, door panel cover, gear knob, arm rests, steering wheels, wheels cover
synthetic leather for appliance on electronic application such as electronic devices such as laptops or tablets providing soft touch feeling synthetic leather for sporting goods and footwear applications watch bands or straps for fitness tracking devices 2 K parts based on overmoulded, coextruded, or back sheet moulded part with the thermoplastic elastomer composition of this invention and compatible material 2 K parts based on overmoulded, coextruded, or back sheet moulded part with the thermoplastic elastomer composition of this invention and non-compatible material+use of adequate adhesion promoter or technique to bond these.

EXAMPLES

The invention is illustrated by the following examples, in which parts and percentages are by weight unless otherwise stated.

The materials used in the Examples were

Si-Rubber 1: Uncatalysed Silicone Rubber Base comprising a vinyl-terminated diorganopolysilxane gum of 70 Shore A hardness with a silica content of 35%

Cat.: Dow corning 'Syl-Off 4000' Platinum Catalyst having a Pt content of 0.40%

XL: Dimethyl, Methylhydrogen Siloxane copolymer, Trimethylsiloxy-terminated of Si-bonded hydrogen content 1.6%

PPH: polypropylene homopolymer, Total PPH 7060

PPC: polypropylene copolymer, Total PP 108 MF 10,

TPO 1: polypropylene copolymer, Exxon VISTAMAXX® 6202

SBC 1: Styrene block Copolymer 1: DYNASOL CALPRENE® H6174

SBC 2: Styrene block Copolymer 2: DYNASOL CALPRENE® H6171

COUPLING AGENT 1: random terpolymer of ethylene, acrylic ester and glycidyl methacrylate, ARKEMA LOTADER® AH8900

COUPLING AGENT 2: Polypopylene grafted anhydride maleic: ARKEMA OREVAC® CA100

FILLER: Calcium Carbonate, OMYA OMYACARB® 5 AV

SiMB: Dow Corning® Siloxane Masterbatch MB50001

AO: BASF Irganox® 1010, tetrakis(methylene(3,5-ditert-butyl-4-hydroxy-hydrociannate)methane UV Additive: Oligomeric Hindered Amine Light stabilizer (HALS), CIBA TINUVIN® 622

BLACK COLOR MASTERBATCH: Carbon black concentrates in Polyethylene (PE), A. Schulman Plastics BVBA POLYBLAK BLACK 1423

Thermoplastic elastomers were prepared by the process of the invention. The mixing of components and vulcanisation was carried out using a twin screw extruder, 25 mm of diameter and 48 L/D. The processing section was heated in a range from 180° C. up to 220° C. the screw speed was 200 rpm and the throughput rate was 15 kg/hour. Si-Rubber 1 was added to organic thermoplastic preblend (PPH, PPC, TPO, SBC, additives and coupling agent) within the two first sections of the extruder. The organohydridopolysiloxane XL is added into the blend to achieve a good dispersion of these two silicone components in the thermoplastic before addition of the catalyst, which initiates the vulcanization of the silicone composition within the thermoplastic matrix. Feeding zones for each component are fixed and located within the first half of the twin screw extruder barrel. The proportions of materials used are shown in Tables 1 and 2 below.

Test specimens for mechanical and scratch resistance testing were prepared by injection moulding. Heating temperature for injection moulding was set at 180° C. to 220° C. and mold temperature set at 40° C. The mechanical properties were tested according to international standards as set out in Tables 1 and 2.

Scratch performance measurement relies on a test protocol specifically developed to characterize scratch resistance of soft elastomeric products corresponding to typical hardness of 40 Shore A to 45 Shore D defined according to ISO 868 standard for elastomer and rubber material. Scratch resistance protocol used relies on a quantitative measurement of the aspect change of a moulded specimen caused by scratch lines. The aspect change is a translation of both chromatic aberration measurement and gloss change before and after scratch is performed onto the specimen. For comparison purpose and to increase testing consistency and robustness a calibrated hardness scratch tester 430 PII supplied by Erichsen has been used. Scratch hardness tester is set to perform a scratch pattern composed of 80 parallel line spaced 0.5 mm apart using a ball shape scratch tip of 0.5 mm of diameter on which a constant loading of 10N is applied. The results of scratch performance presented in Table 1 are calculations representative of the residual aspect of the surface, after the impact of scratch, compared to the undamaged surface. The lower the value, the higher the scratch resistance is.

Cohesive adhesion is assessed by peel test according to Renault D41 1916 Standard. Cohesion is defined as the internal strength of an adhesive as a result of a variety of interactions within the adhesive. Adhesion is the bonding of one material to another, namely of an adhesive to a substrate, due to a variety of possible interactions. The cohesive adhesion is assessed by measuring the applied peeling force. The peeling action may result in a tearing within the elastomer (cohesive failure), causing some amount (layer) of elastomer to remain on the rigid support after testing; or may result in a total or partial removal of the elastomer from the rigid support (adhesive failure). In the present case, the test allows for the characterization of the adhesion of overmoulded thermoplastic elastomers on rigid supports (here polypropylene) by measuring the force required to pull the overmoulded thermoplastic elastomers off of the rigid support, using a Zwick mechanical tester with a test speed of 100 mm/minute, at an angle of 90°. Typically, the present overmoulded thermoplastic elastomers show cohesive adhesion to the rigid polypropylene support, that is, the overmoulded thermoplastic elastomer remain adhered to the rigid polypropylene support as the thermoplastic elastomer is torn upon peeling.

Example 1 and Comparative Examples 1 and 2

Comparative example 1, a silicone free thermoplastic elastomer, Comparative example 2, a silicone based thermoplastic elastomer free of coupling agent, and Example 1, per the present invention, a silicone based thermoplastic elastomer comprising a coupling agent, were prepared as presented in Table 1, and compared for standard properties and scratch resistance, as presented in Table 2.

Comparative example 1 shows the properties of a silicone free material, that is a, a silicone free thermoplastic elastomer, also designated as TPE-S. The material, containing a plasticizer oil, has a hardness in the same range as Comparative example 2 and Example 1. The formulation of Comparative example 1 shows a low surface performance (Scratch and abrasion) comparatively to Example 1 according to the invention.

Comparative example 2, a silicone based thermoplastic elastomer, has a hardness in the same range as Comparative example 1 and Example 1. The absence of coupling agent dramatically impacts the surface resistance as shown by a loss of color and a loss of gloss 3 times higher, comparatively to Example 1.

Example 1 containing components A, B, C D and E shows the highest surface properties performance per the scratch and abrasion tests, that is, a low color loss and low gloss loss, together with acceptable volume loss. Cohesive adhesion to polypropylene is significantly improved over Comparative examples 1 and 2.

TABLE 1

| Ingredient | Comparative example 1 | Comparative example 2 | Example 1 |
|---|---|---|---|
| XL | | 0.61% | 0.84% |
| CAT | | 0.29% | 0.40% |
| Black color Masterbatch | 2.00% | 2.00% | 2.00% |
| A0 & UV additive | 0.60% | 0.60% | 0.60% |
| COUPLING AGENT 1 | | | 5.00% |
| Si RUBBER, | | 20.69% | 28.70% |
| PPC | | 10.00% | 10.00% |
| PPH 1 | 20.00% | | |
| PLASTICIZER OIL | 45.00% | 6.33% | 5.46% |
| SBC 1, | 25.00% | 9.85% | 8.50% |
| SBC 2 | | 9.85% | 8.50% |
| Filler | 7.40% | | |
| TPO 1 | | 39.50% | 30.00% |

TABLE 2

| Property (method) | Unit | Comparative example 1 | Comparative example 2 | Example 1 |
|---|---|---|---|---|
| Hardness (ISO 868) | Shore A | 68 | 63.20 | 65.00 |
| Spiral flow length (internal) | cm | 100 | 33.6 | 27.7 |
| Compression set 24 h/23° C. | % | 26 | 29.3 | 29.8 |
| Compression set 24 h/70° C. | % | 46 | 79.8 | 80.2 |
| Tensile strength at break - transversal- 500 mm/min (ISO 37) | MPa | 8 | 5.40 | 7.80 |
| Elongation at break - transversal-500 mm/min (ISO 37) | % | 765 | 744.00 | 831.00 |
| Tear resistance (ISO 34) | kN/m | 26 | 32.00 | 40.10 |
| Scratch resistance 80 * 0.5 * 10 N (internal) | Delta color | −3.62 | −3.06 | −1.11 |
| Scratch resistance 80 * 0.5 * 10 N (internal) | Delta gloss | −1.2 | −1.17 | −0.47 |
| Abrasion, Loss of volume (mm3) (internal) | mm3 | 103 | 193 | 97 |
| Cohesive adhesion (Renault D41 1916 Standard) - Maximum peel force | N | 32 | 40 | 54 |

Examples 2 to 4

Examples 2 to 4 represent silicone based thermoplastic elastomers comprising a coupling agent per the present invention, where the level of said coupling agent has been varied, as presented in Table 3.

The performances of Examples 2 to 4, as presented in Table 4, indicate low color and glow loss, with good volume loss below 60 mm3. Cohesive adhesion to polypropylene is confirmed by the peel test as described above, with a maximum peeling force of 60 Newton or above.

TABLE 3

| Ingredient | Example 2 | Example 3 | Example 4 |
|---|---|---|---|
| XL | 0.84% | 0.84% | 0.84% |
| CAT | 0.4% | 0.4% | 0.4% |
| Black color Masterbatch | 2% | 2% | 2% |
| A0 & UV additive | 0.6% | 0.6% | 0.6% |
| COUPLING AGENT 1 | 4.84% | 3.22% | 1.61% |
| Si RUBBER, | 28.7% | 28.7% | 28.7% |
| PPH1 | 11.60 | 11.60 | 11.60 |
| SiMB | 3% | 3% | 3% |
| PLASTICIZER OIL | | | |
| SBC 1, | 10.31 | 10.31 | 10.31 |
| SBC 2 | 10.31 | 10.31 | 10.31 |
| Filler | | | |
| TPO 1 | 4.84% | 4.84% | 4.84% |
| TPO2 | 22.56% | 24.17% | 25.79% |

TABLE 4

| Property (method) | Unit | Example 2 | Example 3 | Example 4 |
|---|---|---|---|---|
| Hardness (ISO 868) | Shore A | 72.8 | 73.3 | 73.5 |
| Spiral flow length (internal) | cm | 32.1 | 32.4 | 33 |
| Tensile strength at break - transversal-500 mm/min (ISO 37) | MPa | 8.98 | 10.20 | 9.9 |
| Elongation at break - transversal-500 mm/min (ISO 37) | % | 786 | 811 | 800 |
| Tear resistance (ISO 34) | kN/m | 51.75 | 53.15 | 54.34 |
| Scratch resistance 80 * 0.5 * 10 N (internal) | Delta color | −2.24 | −1.57 | −1.06 |
| Scratch resistance 80 * 0.5 * 10 N (internal) | Delta gloss | −1.17 | −0.9 | −0.8 |
| Abrasion, Loss of volume (mm3) (internal) | mm3 | 66 | 61 | 59 |
| Cohesive adhesion (Renault D41 1916 Standard) - Maximum peel force | N | 68 | 62 | 60 |

Examples 5 and 6

Examples 5 and 6 represent silicone based thermoplastic elastomers comprising each a different coupling agent per the present invention, as presented in Table 5. The Examples 5 and 6 start off with a higher hardness at 40 to 45 Shore D.

The performances of Examples 5 and 6, as presented in Table 6, indicate low color loss, with acceptable volume loss for the considered hardness. Cohesive adhesion to polypropylene is confirmed by the peel test as described above.

TABLE 5

| Ingredient | Example 5 | Example 6 |
|---|---|---|
| XL | 0.84% | 0.84% |
| CAT | 0.4% | 0.4% |
| Black color Masterbatch | 2% | 2% |
| A0 & UV additive | 0.6% | 0.6% |
| COUPLING AGENT 1 | 5% | 0% |
| COUPLING AGENT 2 | 0% | 5% |
| Si RUBBER | 28.7% | 28.7% |
| PPH1 | 49.96% | 49.96% |
| TPO2 | 15.50% | 15.50% |

TABLE 6

| Property (method) | Unit | Example 5 | Example 6 |
|---|---|---|---|
| Hardness (ISO 868) | Shore A | 43.8 | 44.5 |
| Spiral flow length (internal) | cm | 46.9 | 49 |
| Tensile strength at break - transversal-500 mm/min (ISO 37) | MPa | 17.5 | 19.3 |
| Elongation at break - transversal-500 mm/min (ISO 37) | % | 143.5 | 86.1 |
| Tear resistance (ISO 34) | kN/m | 121.2 | 117.2 |
| Scratch resistance 80 * 0.5 * 10 N (internal) | Delta color | 0.72 | 1.38 |
| Abrasion, Loss of volume (mm3) (internal) | mm3 | 172 | 212 |

What is claimed is:

1. A thermoplastic elastomer composition comprising a blend of:
   (A) a thermoplastic organic polymer comprising
      (A1) a block copolymer elastomer, and
      (A2) a polyolefin elastomer;
   (B) a silicone base comprising
      (B1) a diorganopolysiloxane gum having an average of at least 2 alkenyl groups per molecule, and
      (B2) from 1 to 50% by weight based on the diorganopolysiloxane gum (B1) of a reinforcing filler having a particle size of from 0.5 µm to 20 µm;
   (C) an organohydrido silicone compound which contains an average of at least 2 silicon-bonded hydrogen groups per molecule;
   (D) a catalyst; and
   (E) a coupling agent.

2. The thermoplastic elastomer composition according to claim 1, wherein the coupling agent (E) is selected from glycidyl ester functional polymers or organofunctional grafted polyolefins, polymer compositions comprising a thermoplastic polymer selected from a polyacetal and a polyolefin, and a branched block copolymer of a polysiloxane and an olefin polymer, or mixtures thereof.

3. The thermoplastic elastomer composition according to claim 1, wherein the reinforcing filler (B2) is silica and is present in the silicone base (B).

4. The thermoplastic elastomer composition according to claim 1, wherein the weight ratio of (A1) to (A2) ranges from 10:90 to 90:10.

5. The thermoplastic elastomer composition according to claim 1, wherein the weight ratio of (A)+(E) to (B)+(C)+(D) ranges from 50:50 to 85:15.

6. The thermoplastic elastomer composition according to claim 1, wherein the coupling agent (E) is present in the thermoplastic elastomer composition at a level of from 0.01 to 25% weight percent of the thermoplastic elastomer composition.

7. The thermoplastic elastomer composition according to claim 1, wherein (A) has a hardness below 45 Shore D, and optionally, a hardness below 85 Shore A.

8. The thermoplastic elastomer composition according to claim 1, having a hardness below 45 Shore D, and optionally, a hardness below 85 Shore A.

9. A part or component for automotive, appliances, electronics, portable electronic, electrical, communication, and/or medical applications, wherein the part or component is formed of the thermoplastic elastomer composition according to claim 1.

10. The part or component according to claim 9, having a hardness below 45 Shore D, and optionally, a hardness below 85 Shore A.

11. A wearable item formed of the thermoplastic elastomer composition according to claim 1.

12. The wearable item according to claim 11, having a hardness below 45 Shore D, and optionally, a hardness below 85 Shore A.

13. A process for forming a vulcanised thermoplastic elastomer, said process comprising contacting:
   (A) a thermoplastic organic polymer comprising
      (A1) a block copolymer elastomer, and
      (A2) a polyolefin elastomer;
   (B) a silicone base comprising
      (B1) a diorganopolysiloxane gum having an average of at least 2 alkenyl groups per molecule, and
      (B2) from 1 to 50% by weight based on the diorganopolysiloxane gum (B1) of a reinforcing filler having a particle size of from 0.5 µm to 20 µm;
   (C) an organohydrido silicone compound which contains an average of at least 2 silicon-bonded hydrogen groups per molecule;
   (D) a hydrosilylation catalyst; and
   (E) a coupling agent;
   wherein the weight ratio of (A)+(E) to (B)+(C)+(D) ranges from 50:50 to 85:15.

14. The process according to claim 13, wherein the thermoplastic organic polymer (A), the silicone base (B), the organohydrido silicone compound (C), the hydrosilylation catalyst (D) and the coupling agent (E) are contacted at a temperature in the range of from 100° C. to 250° C.

15. The process according to claim 13, wherein the thermoplastic organic polymer (A), the silicone base (B), the organohydrido silicone compound (C), the hydrosilylation catalyst (D) and the coupling agent (E) are blended in an extruder.

16. The process according to claim 13, further defined as a process for forming a wearable item intended to be in contact with a wearer's skin when in use.

17. The process according to claim 13, further defined as a process for forming a part or component for automotive, appliances, electronics, portable electronic, electrical, communication, and/or medical applications.

18. The process according to claim 17, wherein the part or component is overmoulded with the vulcanised thermoplastic elastomer.

19. The wearable item according to claim 11, further defined as a bracelet or a support pad for sunglasses, reading glasses or wearable electronics.

* * * * *